United States Patent [19]

Ross

[11] Patent Number: 4,889,010

[45] Date of Patent: Dec. 26, 1989

[54] BICYCLE SAFETY TOE CLIP

[76] Inventor: Edward A. Ross, 15240-½ Dickens St., Sherman Oaks, Calif. 91403

[21] Appl. No.: 90,434

[22] Filed: Aug. 25, 1987

Related U.S. Application Data

[63] Continuation of Ser. No. 660,027, Oct. 12, 1984, abandoned.

[51] Int. Cl.⁴ ............................................. G05G 1/14
[52] U.S. Cl. .................................. 74/594.6; 74/594.1; 74/594.4
[58] Field of Search ................. 74/594.1, 594.6, 594.4, 74/594.7; 280/611, 625, 615, 623, 626, 631, 11.3, 11.31, 11.32, 11.33, 11.34; 36/131, 132

[56] References Cited

U.S. PATENT DOCUMENTS

| 527,349 | 10/1894 | Scognamillo et al. | 74/594.6 |
|---|---|---|---|
| 557,025 | 3/1896 | Ruden | 74/594.6 |
| 559,952 | 5/1896 | Robertson | 74/594.6 |
| 587,335 | 8/1897 | Shepard | 74/594.6 |
| 605,390 | 6/1898 | Calvert | 74/594.6 |
| 605,536 | 6/1898 | Brice | 74/594.6 |
| 615,217 | 11/1898 | Hill | 74/594.6 |
| 615,679 | 12/1898 | Condell | 74/594.6 |
| 620,266 | 2/1899 | Wodiska | 74/594.6 |
| 622,543 | 4/1899 | Scherff | 74/594.6 |
| 626,165 | 5/1899 | Howard | 74/594.6 |
| 629,627 | 7/1899 | Tomkies | 74/594.6 |
| 638,407 | 12/1899 | Wheeler | 74/594.6 |
| 1,280,505 | 10/1918 | Lowe | 280/11.31 |
| 4,327,602 | 5/1982 | LeBec | 74/594.6 |

FOREIGN PATENT DOCUMENTS

| 17592 | 3/1882 | Fed. Rep. of Germany | 280/11.33 |
|---|---|---|---|
| 3306925 | 8/1984 | Fed. Rep. of Germany | 74/594.6 |
| 384000 | 3/1908 | France | 74/594.6 |
| 993958 | 11/1951 | France | 74/594.6 |
| 22499 | of 1896 | United Kingdom | 74/594.6 |
| 13914 | of 1897 | United Kingdom | 74/594.6 |
| 17870 | of 1897 | United Kingdom | 74/594.6 |
| 21706 | of 1901 | United Kingdom | 74/594.6 |
| 22437 | of 1904 | United Kingdom | 74/594.6 |
| 6577 | of 1907 | United Kingdom | 74/594.6 |
| 22878 | of 1907 | United Kingdom | 74/594.6 |
| 80/01056 | 5/1980 | World Int. Prop. O. | 74/594.6 |

Primary Examiner—Richard E. Moore
Assistant Examiner—Vinh Luong

[57] ABSTRACT

A toe clip retains a rider's foot and includes a lower support. An upper support is pivotally mounted to the lower support for supporting the foot when in a first position and for releasing the foot upon pivoting relative to the lower support to a second position. A retainer is provided for maintaining the upper support in the first position when the retainer is in a first retaining position and releases the upper support when a lateral component of force is applied to the retainer.

2 Claims, 2 Drawing Sheets

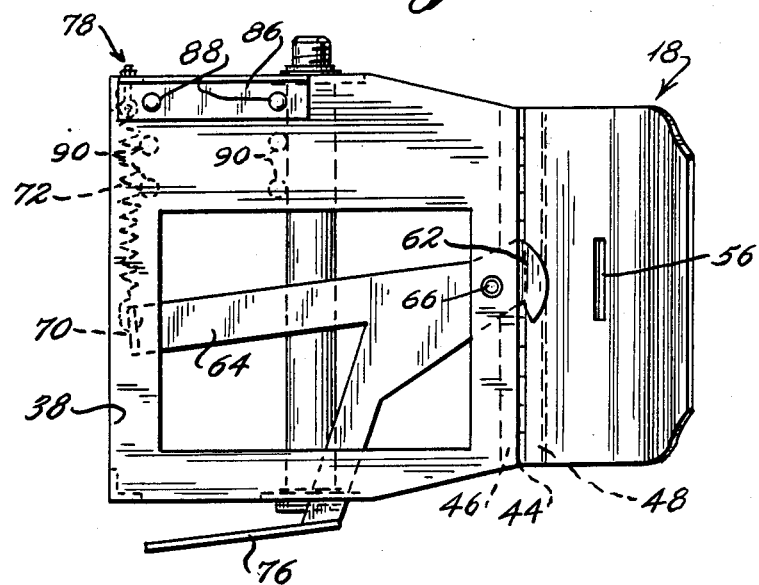
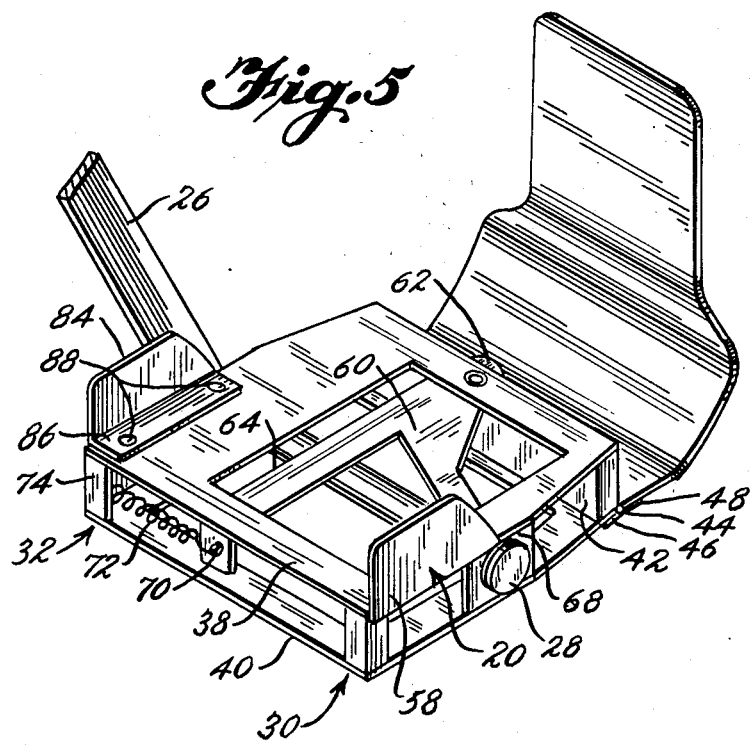

BICYCLE SAFETY TOE CLIP

CROSS-REFERENCE TO RELATED APPLICATIONS

This is a continuation of application Ser. No. 660,027, filed Oct. 12, 1984, now abandoned.

FIELD OF THE INVENTION

This invention relates to bicycles and more specifically to bicycle toe clips.

BACKGROUND OF THE INVENTION

There are many bicycle toe clips on the market today, all of which are designed to anchor the cyclist's shoe on the bicycle pedal for maximum pedaling efficiency and power. However, because these bicycle pedals so effectively hold the shoe in place, serious and dangerous injury may be caused to the bicyclist's foot in an accident. Injury to the foot may typically be caused by forced lateral movement of the foot relative to the toe clip, until a point is reached where further movement is prevented by the effective retention of the foot by the toe clip. The toe clip of Le Bec, U.S. Pat. No. 4,327,602, shows a bicycle toe clip effective in retaining the bicyclist's foot.

Other bicycle toe clips incorporate an outwardly and downwardly movable clip portion which pivots relative to the bicycle pedal. These clips are ordinarily in an open or downward position when the foot is not placed on the pedal. Pressure of the foot on the pedal and on a plunger or lever arm causes the clip portion to orient itself over the rider's foot on the pedal. Such toe clips are shown in Condell, U.S. Pat. No. 615,679 and Wheeler, U.S. Pat. No. 638,407. These references, however, do not provide for release of the clip upon lateral movement of the foot relative to the bicycle toe clip and pedal which may occur during an accident. Scherff, U.S. Pat. No. 622,543, also shows a bicycle toe clip with the above-described deficiencies.

The present invention overcomes the deficiencies in the prior art by providing a support for the rider's foot as well as a quick release mechanism. During normal cycling, no outward or lateral force is applied to the pedal and toe clip by the foot. However, during a fall, outward motion would cause the toe clip to disengage from the foot thereby immediately releasing the otherwise restrictive foot support. The foot can then move free of the bicycle toe clip and pedal. The design of the present invention can be easily adapted to present bicycle pedals and is simple in design.

SUMMARY OF THE INVENTION

A toe clip is provided for retaining a rider's foot and includes a lower support. Upper support means is pivotally mounted to the lower support for supporting the foot when in a first position and for releasing the foot upon pivoting relative to the lower support to a second position. Retaining and releasing means is provided for maintaining the upper support means in the first position when the retaining means is in a first retaining position and for releasing the upper support means when a lateral component of force is applied to the retaining and releasing means.

BRIEF DESCRIPTION OF THE DRAWINGS

FIG. 4 is a schematic and top plan view of the pedal and bicycle toe clip of FIG. 1 showing the toe clip in an open configuration; and FIG. 5 is a schematic and isometric perspective view of the pedal and bicycle toe clip of FIG. 4 with the toe clip in an open configuration.

DETAILED DESCRIPTION OF THE PREFERRED EMBODIMENT

The description herein of the structure and function of the device should be understood as including a description of the method of operating the device.

Figure 1:
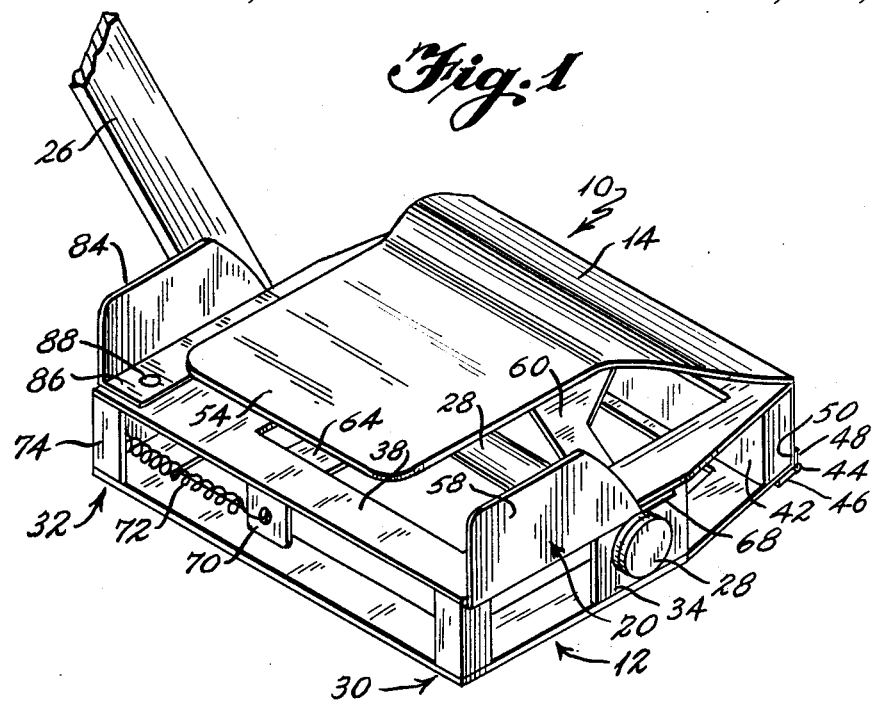
FIG. 1 is a schematic and isometric perspective view of a pedal and bicycle toe clip embodying the present invention.

In FIG. 1, a toe clip 10 is shown mounted to a lower support or pedal 12. The pedal is shown schematically in FIG. 1 and is assumed to be in the configuration of typical pedals generally well known. Modifications to current pedal designs can be easily made by one skilled in the art to accommodate the design of the invention to be described.

Figure 2:
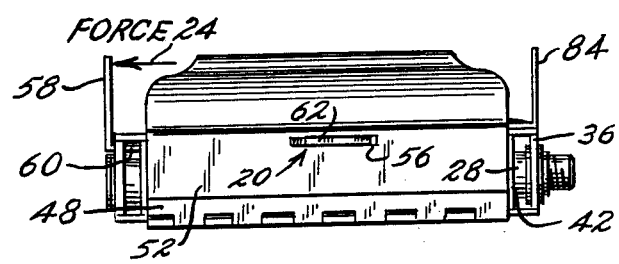
FIG. 2 is a schematic and front elevation view of the pedal and bicycle toe clip of FIG. 1.
Figure 3:
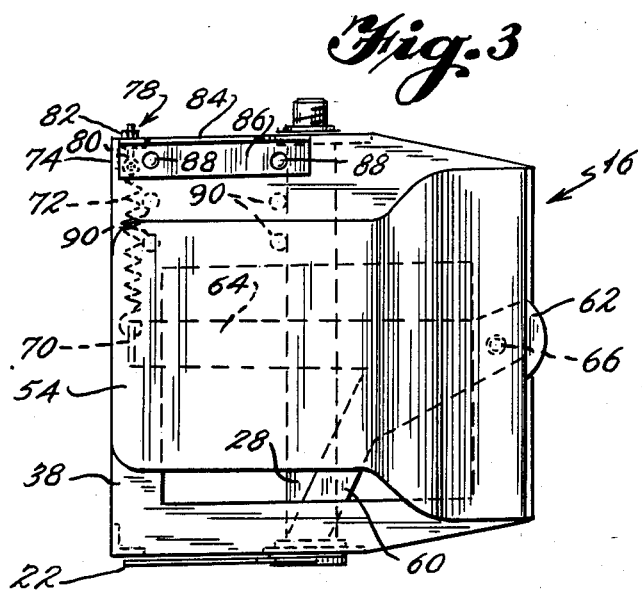
FIG. 3 is a schematic and top plan view of the pedal and bicycle toe clip of FIG. 1.

The toe clip includes upper support means 14 pivotally mounted to the pedal 12 for supporting the foot (not shown) of the rider when in a first position 16 (see FIG. 3). The upper support means releases the rider's foot upon pivoting of the upper support means relative to the pedal 12 to a second position 18, as seen in FIG. 4. Retaining and releasing means 20 is provided for maintaining the upper support means in the first position when the retaining means is in a first retaining position 22 (FIG. 3) and for releasing the upper support means when a lateral component of force 24 (FIG. 2) is applied to the retaining and releasing means 20. The lateral force may result from movement of the rider's foot, for example rotational movement of the foot about an axis extending through and normal to the ball of the foot. In other words, if the rider's foot is twisted for any reason, the upper support will be released when a lateral force is applied to the retaining and releasing means.

Considering the device of FIG. 1 in more detail, the pedal 12 is coupled to a bicycle crank 26 through a horizontal spindle 28 and appropriate bearings (not shown) as is known. The spindle extends from a first or left side 30 of the pedal to a second or right side 32 of the pedal to the crank 26. The identification of right and left side is taken to be according to a frontal view of the pedal as shown in FIG. 2. Identification of top and bottom portions is to be taken according to the views of FIGS. 1 or 2. The spindle 28 is supported in the pedal on the left side by a left center brace 34 and on the right side by a right center brace 36 (FIG. 2).

The pedal 12 includes a bearing surface 38 for supporting the bottom of the rider's foot in a plane 39 defined by the bearing surface and a bottom surface 40 comprising the bottom of the pedal. The bearing surface 38 may be any element or combination of elements which maintain the rider's foot on a plane relative to the remainder of pedal 12. For example, the bearing surface 38 may be parallel, spaced apart rails as in Wheeler, above, a flat plate or a segmented surface. The bottom surface 40 may be symmetric with the bearing surface 38. The use of the term "foot" is intended to encompass cycling shoes, etc. The bearing surface 38 and bottom surface 40 are supported on appropriate sides of the center braces 34 and 36 and may be supported at other locations according to the desired design of the bicycle pedal.

The pedal includes a front brace 42 preferably extending from the left side 30 to the right side 32 between the front of bearing surface 38 and of bottom surface 40. The front brace 42 along with the front portion of bearing surface 38 supports the rider's foot at the front of the pedal.

A pivot or hinge 44 is mounted to the bottom of the front brace 42 and preferably extends the distance of front brace 42 from the left side 30 to the right side 32 of pedal 12. The pivot 44 allows movement of the upper support means 14 from the first position to the second position to allow disengagement of the rider's foot from the toe clip 10. The pivot 44 includes a bottom leaf 46 mounted to the bottom surface 40 or the bottom of front brace 42 as desired. The pivot 44 includes a second leaf 48 for mounting the upper support means 14.

The upper support means has a lower end 50 preferably adjacent the front of the bottom surface 40 and mounted to the second leaf 48 of pivot 44. The lower end 50 preferably extends the distance from the left side to the right side. The upper support means 14 forms a front surface 52 (FIG. 2) extending upwardly from the second leaf 48 along front brace 42 to the bearing surface 38. The upper support means 14 then extends upwardly and rearwardly to a rear portion 54 extending over the pedal 12 for supporting the rider's foot from above. The configuration of the upper support means 14 above bearing surface 38 may be varied as desired. The configuration of the upper support means 14 shown in FIG. 1 provides broad support to the upper part of the rider's foot but does not completely cover the bearing surface 38 of the pedal. The rear portion 54 may extend the entire distance to the rear of the pedal o may extend only part way thereto. Preferably, the form of the rear portion 54 is such that a maximum amount of support is provided to the rider's foot while still allowing disengagement of the rider's foot from the toe clip and pedal in an accident.

As shown in FIG. 2, the front surface 52 of the upper support means includes an aperture or port 56 extending through the upper support means 14. Port 56 is preferably a narrow horizontally extending and rectangular port through which a portion of the retaining and releasing means 20 extends for retaining the upper support means 14 in the first position. The port 56 may be positioned on the front surface 52 as desired as long as the upper support means is adequately retained by the retaining and releasing means 20 and also so that the upper support means 14 allows easy disengagement of the rider's foot during an accident.

Considering FIGS. 1-4, the retaining and releasing means includes a left side flange 58 extending upwardly past the left side of bearing surface 38 for providing a side to a part of the rider's foot. The left side flange 58 is preferably near the left rear portion of the pedal 12 and is designed such that lateral movement thereof is allowed at least in part in the plane of the bearing surface 38.

The retaining and releasing means 20 further includes an angled bar 60, a latch 62 and a center bar 64 for retaining the upper support means 14 in the first position and for releasing the upper support means 14 for allowing movement thereof to the second position. The angled bar 60, latch 62 and center bar 64 join together and are attached to the front brace 42 through a vertical pivot pin 66, FIG. 3, for allowing the retaining and releasing means 20 to pivot with respect to the pedal 12. Pivot pin 66 is preferably oriented at a midpoint of the front brace 42 between the left and right sides of pedal 12. The angled bar 60 extends rearwardly from the pivot pin toward the left side 30 of pedal 12 to the bottom of left side flange 58. The center bar 64 extends rearwardly from the pivot pin to the rear of pedal 12. Latch 62 extends forward of pivot pin 66 through the port 56 when the upper support means 14 is in the first position (see FIG. 3).

The left side flange 58, angled bar 60, latch 62 and center bar 64 are formed so that application of a lateral force 24 to the left side flange 58 results in pivoting of the retaining and releasing means 20 about pivot pin 66 to the configuration shown in FIG. 4. The left side flange 58 moves outwardly relative to the pedal 12, the latch 62 disengages from the port 56 in the upper support means and the center bar 64 moves off-center relative to the pedal toward the left side 30. The retaining and releasing means 20 may also return to its original position when the lateral force 24 is removed from the left side flange 58.

The angled bar 60, center bar 64 and pivot pin 60 are preferably positioned in the pedal 12 to minimize the possibility of damage to those elements during use of the pedal. For example, the angled bar 60 and center bar 64 may be positioned between the bearing surface 38 and a parallel plane containing the bottom surface 40 so that the rider's foot does not contact the angled bar and center bar. In this configuration, the angled bar 60 may extend from pivot pin 66 above spindle 28 and through a gap 68 formed in the left center brace 34 to couple with the left side flange 58. Gap 68 is formed in such a way as to allow outward lateral movement of the left side flange 58 and angled bar 60 without interfering with the left center brace 34 and spindle 28. Alternatively, the angled bar 60 may be positioned to extend below spindle 28.

A flange 70 is mounted at the rearward terminus of center bar 64 for coupling a biasing means in the form of a spring 72 between the retaining and releasing means 20 and the pedal 12. The spring is preferably mounted to the right side 32 of the pedal at a right rear corner brace 74. The spring 72 provides a bias for biasing the retaining and releasing means in the first retaining position 22. Similarly, when the lateral force 24 moves the retaining and releasing means 20 to the left of pedal 12 to a second position 76, the spring biases the retaining and releasing means back toward its original fist position 22. See FIGS. 3 and 4.

As shown in FIG. 3, means 78 may be provided for adjusting the tension in the spring 72 for defining the force 24 required to disengage the latch 62 from port 56. Adjust means 78 may include an adjust bolt in the form of thumb screw 80 extending through the right rear corner brace 74 and about which is threaded an adjust nut 82. The spring is coupled to the adjust nut 82. The adjust means 78 may be adjusted by turning thumb screw 80 as appropriate.

The toe clip 10 further includes a right side support 84 extending vertically from the right side 32 of the pedal above the plane containing the bearing surface 38. The right side support 84 provides support for the side of the rider's foot. The right side support 84 includes a horizontal portion 86 for mounting to the pedal 12. The right side support 84 is mounted to the pedal 12 with bolts 88 through the horizontal portion 86. As shown in FIG. 3, alternate bolt positions 90 may be provided in the pedal for adjusting the position of the right side support 84.

The operation of the device will now be described with respect to the FIGURES. Starting with the configuration of the bicycle pedal 12 as shown in FIG. 1, the rider's foot is positioned between right side support 84 and left side flange 58 and below upper support means 14 so that the foot is supported by the bearing surface 38. During normal pedaling, the only significant forces applied to the pedal and toe clip are forces on bearing surface 38 and upper support means 14. In case of an accident, injury to the rider's foot may typically arise due to twisting of the rider's foot in an outward direction relative to the pedal 12 and crank 26. A component of force 24 is thereby applied to the left side flange 58. The left side flange 58 and angled bar 60 move outwardly about pivot pin 66 against the bias of spring 72. The extent of lateral movement of the left side flange 58 and angled bar 60 is determined by the adjustment of adjust means 78 and the spring constant of the spring 72. When the lateral force is sufficient to move the retaining and releasing means 20 to the second position 76, the upper support means 14 is allowed to pivot forward by the force of the foot or of its own weight about pivot 44. The upper support means 14 is thereby disengaged from the rider's foot so that the rider's foot can move further in a forward or lateral direction without injury.

To reconfigure the toe clip 10 and pedal 12 in the original form as shown in FIG. 3, the upper support means 14 is pivoted about pivot 44 in the opposite direction as discussed above so that the front surface 52 becomes flush with the front brace 42. While so doing, it may be necessary to hold the left side flange 58 in the second position 76 against the bias of spring 72 to allow the port 56 to go about latch 62. When the front surface is flush with the front brace 42, the left side flange 58 may be moved toward crank 26 or released allowing the bias of spring 72 to return the retaining and releasing means 20 to its first retaining position 22. The pedal is then in its original configuration.

It should be noted that the above are preferred configurations, but others are foreseeable. The described embodiments of the invention are only considered to be preferred and illustrative of the inventive concepts. The scope of the invention is not to be restricted to such embodiments. Various and numerous other arrangements may be devised by one skilled in the art without departing from the spirit and scope of the invention.

What is claimed is:

1. A bicycle toe clip comprising:
   a pedal comprising a bearing surface and a front;
   a hinge mounted to the front of the pedal;
   an upper support for supporting a rider's foot, comprising a front surface extending across the front of the pedal having an edge coupled to the hinge, an upper surface for extending over the pedal, and an opening in the edge;
   a hook means for interlocking with the opening comprising a pivot point about which the hook means pivots;
   a pivot for movably anchoring the hook means; and
   a flanged portion coupled to the pivot point for pivoting the hook means upon movement of the flanged portion.

2. The combination as claimed in claim 1 further comprising a spring coupling the flanged portion to the pedal through a support for biasing the flanged portion.

* * * * *